3,271,435
BIS[DI(2-SUBSTITUTED ETHYL)AMINOMETHYL] BENZENE COMPOUNDS
David Irwin Randall, Easton, Pa., and Wilhelm Schmidt-Nickels, Little York, N.J., assignors to General Aniline & Film Corporation, New York, N.Y., a corporation of Delaware
No Drawing. Filed Sept. 14, 1964, Ser. No. 396,410
5 Claims. (Cl. 260—458)

This application is a continuation-in-part of our co-pending application Serial No. 153,688, filed November 20, 1961.

This invention relates to the production of novel chemical compounds and more particularly to aminobenzene and nitrobenzene compounds containing two novel substituent groups.

In accordance with this invention, novel compounds are provided which may be defined broadly as compounds having the type formula (I)

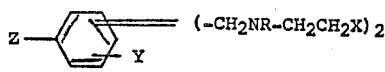

wherein X is hydroxy or the anion of a strong acid, Y is H, lower alkyl or lower alkoxy such as methyl, ethyl, methoxy or ethoxy, R is —CH$_2$CH$_2$X or an inert substituent radical such as alkyl, cycloalkyl, aryl, or heterocyclic, and Z is nitro or amino. Specifically preferred compounds of the above type formula are those of the formula (II)

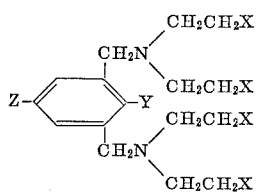

wherein X is an anion selected from the group consisting of hydroxy, chloro, bromo, sulfato, phosphato, and benzenesulfonyloxy, Y is selected from the group consisting of H, lower alkyl and lower alkoxy, and Z is selected from the group consisting of —NO$_2$ and —NH$_2$. The above defined compounds of this invention are unexpectedly useful as miticides, nematocides, herbicides, cross-linking agents in the production of resins and in the creaseproofing of textile materials, and intermediates for the production of fiber-reactive dyestuffs. For example, compounds of Formula II above wherein Z is amino and X is the anion of a strong acid such as chloro or sulfato or the like, may be reacted with a known dye-stuff containing a radical reactive with the amino group in the intermediate such as an —SO$_2$Cl radical resulting in an —SO$_2$NH— linking moiety, an —CH$_2$Cl radical resulting in an —CH$_2$NH— linking moiety, or a bromide or chloride radical resulting in an —NH— linking moiety. A dyestuff is thus produced which reacts and cross-links with fibers containing a reactive hydrogen atom such as cellulose when applied in the presence of an acid-binding agent to yield dyeings and prints with improved fastness properties.

In the above formulae, X preferably represents sulfato or chloro, in addition to hydroxy, and less preferably bromo, phosphato or benzenesulfonyloxy, all these groups having been found to be highly effective termini for providing the compound and dyestuffs containing the same grouping with improved reactivity and cross-linking capabilities. Generally however X may represent the anion of any other strong acid having the dissociation constant greater than 2.0×10$^{-5}$ including for example the anions of hydrofluoric, hydroiodic, phosphonic, phosphinic, trichloracetic, dichloracetic, chloracetic, formic, and the like.

Y in the above formulae represents H, lower alkyl such as methyl or ethyl, or lower alkoxy, such as methoxy or ethoxy or the like, and is preferably in para position relative to Z. The two —CH$_2$N= groups are preferably in meta positions relative to Z, such positioning having been found to yield improved reactivity and cross-linking capabilities to the compounds and dyestuffs containing the defined groupings.

In general, the compounds of the invention may be prepared by bis-chloromethylation of nitrobenzene, p-nitrotoluene or p-nitroanisole or the like, reaction of the resulting bis-chloromethylated nitrobenzene of the formula (III)

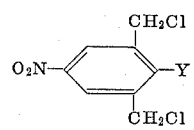

with diethanolamine to produce compound of Formula II above wherein X is OH and Z is nitro. The nitro group in this compound may then be reduced to amino as by catalytic hydrogenation under pressure in ethanol in the presence of platinum oxide catalyst (Adam's catalyst) to produce the compound of Formula II above wherein X is OH and Z is amino. The latter compound may then be reacted with a suitable esterifying agent of the type described above and in known manner to replace the terminal OH groups by acid anion groups. Preferred esterifying agents are HCl or thionyl chloride in chloroform (X=Cl, HBr (X=Br), 100% sulfuric acid or oleum (X=sulfato), phospholeum (X=phosphato), and benzene disulfonyl chloride (X=benzene sulfonyloxy).

The following examples are only illustrative of the present invention and are not to be regarded as limitative. All parts and proportions referred to herein and in the appended claims are by weight unless otherwise indicated.

*Example 1*

A charge of 250 parts by volume ethanol,
52.4 parts diethanolamine, and
23.2 parts 2,6-bis-chloromethyl-4-nitrotoluene is stirred at 60° C. for ½ hour and then at reflux for 2 hours. Then parts by volume ethanol are distilled off through a downward condenser. The remaining liquid is poured into
500 parts by volume water.

The pH of the solution is raised to 10 by the addition of 20% Na$_2$CO$_3$ solution. The reaction product is salted out by the addition of
230 parts by weight sodium chloride. The precipitate is filtered and dried. The product has the formula:

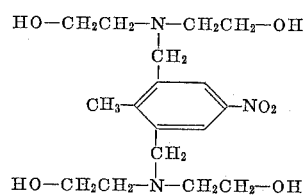

*Example 2*

For the catalytic reduction of the nitro group in the product of Example 1 a pressure shaker is charged with 200 parts by volume ethanol,
17.1 parts of the nitro compound and
0.2 part platinum oxide catalyst (Adam's catalyst).

Hydrogen is charged to a pressure of 60 lbs. While the charge is shaken, the pressure falls to 48 lbs. within 1 hour and 45 minutes and remains constant. After removal of the catalyst by filtration, the alcohol is evaporated. The remaining compound has the formula:

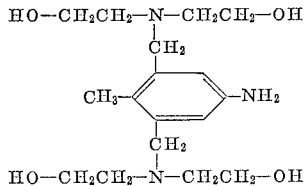

*Example 3*

18.4 parts of the product of Example 2 are introduced into 170 parts by volume chloroform. To the solution is added under vigorous agitation
19.7 parts by volume thionyl chloride. A precipitate forms. The charge is stirred at reflux for 2 hours. The reaction product settles at the bottom of the reaction vessel. The liquid is decanted from the settled product at room temperature. The compound has the formula:

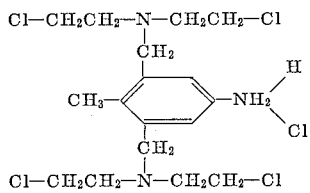

*Example 4*

12 parts of the product of Example 2 are introduced into 115 parts by volume conc. hydrochloric acid (36%). The solution is heated at 73° C. for 1 hour and 10 minutes and then evaporated to dryness. The product is identical with the compound of Example 3.

*Example 5*

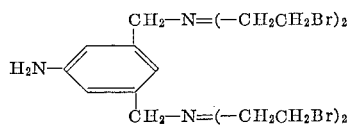

The compound of the above formula is prepared by following the procedures of Examples 1, 2 and 4 above except that the 2,6-bis-chloromethyl-4-nitrotoluene is replaced by 2,6-bis-chloromethyl-4-nitrobenzene, and the hydrochloric acid is replaced by hydrobromic acid.

*Example 6*

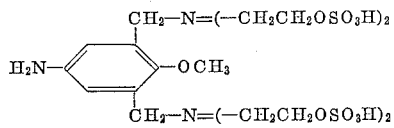

The procedures of Examples 1 and 2 above are repeated except that the 2,6-bis-chloromethyl-4-nitrotoluene is replaced by 2,6-bis-chloromethyl-4-nitroanisole.
16 parts of the resulting compound are gradually introduced under cooling below 20° C. into
16 parts by volume of 100% $H_2SO_4$. The charge is stirred overnight allowing it to warm up to room temperature, drowned in ice, and the compound of the above formula recovered by salting it with sodium chloride and filtering.

*Example 7*

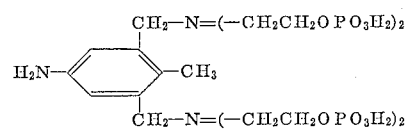

32 parts of phospholeum ($P_2O_5 = H_3PO_4$) is heated to 50° C. to lower its viscosity. There is then added to it under agitation.
15 parts of the product of Example 2 above. The temperature rises spontaneously to about 92° C. The reaction medium is stirred overnight at 75° C. and then poured into
400 parts of ice and water and the compound of the above formula recovered by salting out with sodium chloride and filtering.

*Example 8*

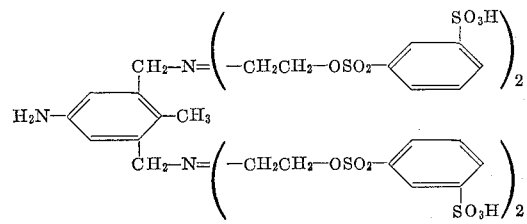

One mole of the product of Example 2 is added to a solution of 4.5 moles of benzene disulfonyl chloride in pyridine. The resulting mixture is heated at about 40° C. for about 1 hour, the mixture cooled and drowned in cold water after which it is adjusted to a pH of about 6.0 with 50% potassium hydroxide solution and the pyridine and water mixture distilled off under vacuum at temperatures below 60° C. After all the pyridine is removed, the compound of the above formula is recovered by evaporating the resulting aqueous solution on a steam bath and drying under vacuum.

This invention has been disclosed with respect to certain preferred embodiments and it will be understood that various modifications and variations thereof will become obvious to persons skilled in the art. It will for example be apparent that one or more of the hydrogen atoms in the terminal —$CH_2CH_2X$ groups may be replaced by inert substituents such as alkyl, cycloalkyl, aryl, and the like, and that the compounds of the invention may be produced or used in the form of their free acids or their salts, e.g. alkali metal salts. It is to be understood that all such obvious modifications and variations are to be included within the spirit and purview of this invention and application and the scope of the appended claims.

We claim:
1. A compound of the formula

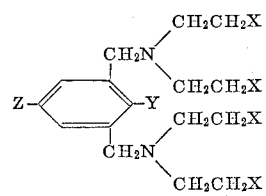

wherein

X is selected from the group consisting of hydroxy, chloro, bromo, sulfato, phosphato, and benzenesulfonyloxy, Y is selected from the group consisting of H, lower alkyl and lower alkoxy, and Z is selected from the group consisting of $-NO_2$ and $-NH_2$.

2. A compound as defined in claim 1 wherein X is hydroxy, Y is methyl and Z is nitro.

3. A compound as defined in claim 1 wherein X is hydroxy, Y is methyl and Z is amino.

4. A compound as defined in claim 1 wherein X is chloro, Y is methyl and Z is amino.

5. A compound as defined in claim 1 wherein X is sulfato, Y is methyl and Z is amino.

References Cited by the Examiner

UNITED STATES PATENTS

| | | | |
|---|---|---|---|
| 2,671,105 | 3/1954 | Sprague et al. | 260—456 |
| 2,959,618 | 11/1960 | Kyrides | 260—570.9 |
| 3,143,566 | 8/1964 | Surrey | 260—570.9 X |

OTHER REFERENCES

Isidate, C. A., vol. 52, p. 6241d (1958).

Wilson et al., J.A.C.S., vol. 73, pp. 3635–3641 (1951).

CHARLES B. PARKER, *Primary Examiner.*

JOSEPH P. BRUST, *Examiner.*

FLOYD D. HIGEL, *Assistant Examiner.*

UNITED STATES PATENT OFFICE
CERTIFICATE OF CORRECTION

Patent No. 3,271,435                              September 6, 1966

David Irwin Randall et al.

It is certified that error appears in the above identified patent and that said Letters Patent are hereby corrected as shown below:

Column 2, line 34, "(X=Cl" should read -- (X=Cl) --.

Signed and sealed this 10th day of March 1970.

(SEAL)
Attest:

Edward M. Fletcher, Jr.
Attesting Officer

WILLIAM E. SCHUYLER, JR.
Commissioner of Patents